United States Patent [19]

Palinkas et al.

[11] Patent Number: 4,921,029
[45] Date of Patent: May 1, 1990

[54] TRAPEZOIDAL NON-PNEUMATIC TIRE WITH SUPPORTING AND CUSHIONING MEMBERS

[75] Inventors: Richard L. Palinkas, Northfield, Conn.; Scott R. Pajtas, Warren, Mich.

[73] Assignee: The Uniroyal Goodrich Tire Company, Akron, Ohio

[21] Appl. No.: 354,589

[22] Filed: May 22, 1989

Related U.S. Application Data

[63] Continuation-in-part of Ser. No. 190,299, May 4, 1988, abandoned, and a continuation-in-part of Ser. No. 787,867, Oct. 16, 1985, abandoned, and a continuation-in-part of Ser. No. 600,932, Apr. 16, 1984, abandoned.

[51] Int. Cl.$^5$ .............................................. B60C 7/00
[52] U.S. Cl. ......................................... 152/11; 152/7; 152/323; 301/63 PW
[58] Field of Search ................... 152/1, 5, 7, 11, 12, 152/323, 324, 325, 326, 327, 328, 256; 301/5 R, 63 PW

[56] References Cited

U.S. PATENT DOCUMENTS

| | | | |
|---|---|---|---|
| 1,591,982 | 7/1926 | Kirkwood | 152/326 |
| 3,188,775 | 6/1965 | Cosmos | 152/7 |
| 3,219,090 | 11/1965 | Cislo | 152/7 |
| 3,870,372 | 3/1975 | Knipp | 301/63 PW |
| 3,888,545 | 6/1975 | Braun | 301/63 PW |
| 3,957,101 | 5/1976 | Ippen et al. | 152/5 X |
| 4,218,098 | 8/1980 | Burton | 152/323 X |
| 4,362,202 | 12/1982 | Sacks | 152/325 |

FOREIGN PATENT DOCUMENTS 2460051 7/1976 Fed. Rep. of Germany ....... 152/325

*Primary Examiner*—Russell D. Stormer
*Attorney, Agent, or Firm*—Alfred D. Lobo; Alan A. Csontos

[57] ABSTRACT

A trapezoidal non-pneumatic tire ("TNPT") is integrally molded from a stiff, resilient elastomeric material with particular specifications, to form a unitary structure comprising outer and inner cylindrical coaxial members ("hoops"), the outer being wider than the inner. The outer hoop is supported and cushioned by a plurality of circumferentially spaced apart, planar rib members (ribs) and a planar central web member (web) which connects the hoops at their circumferential center lines. The web lies in a plane perpendicular to the rotational axis of the TNPT. The ribs extend axially along the inner and outer hoops, connecting them, and the edges of the ribs lie along the opposite faces of the web. The ribs are angled in the range from 15° to 75° to radial planes which intersect them at their radially inner ends, and the ribs on one side of the web are angled oppositely from those on the other. A rubber tread is secured to the outer surface of the outer hoop. The coaction of the structural elements of the TNPT provides a load-supporting structure which, in operation, is subjected to continuous compression and tensile forces as it travels over the ground. Deformation and buckling characteristics of the TNPT are derived from its unique trapezoidal shape which results in an interaction of the structural elements such that the outer hoop is not pulled under the wheel as much as the outer hoop would have been, had the shape of the TNPT been rectangular. The trapezoidal shape provides the TNPT with improved "handling" characteristics in hard turns without sacrificing a "ride" which is suprisingly similar to that of a conventional pneumatic tire.

14 Claims, 7 Drawing Sheets

BUMPSTOP

800lb. LOAD 2.68 TNPT
NORMAL

DIRECTION OF
WHEEL HEADING

FIG. 11    2.68 RNPT CORNERING
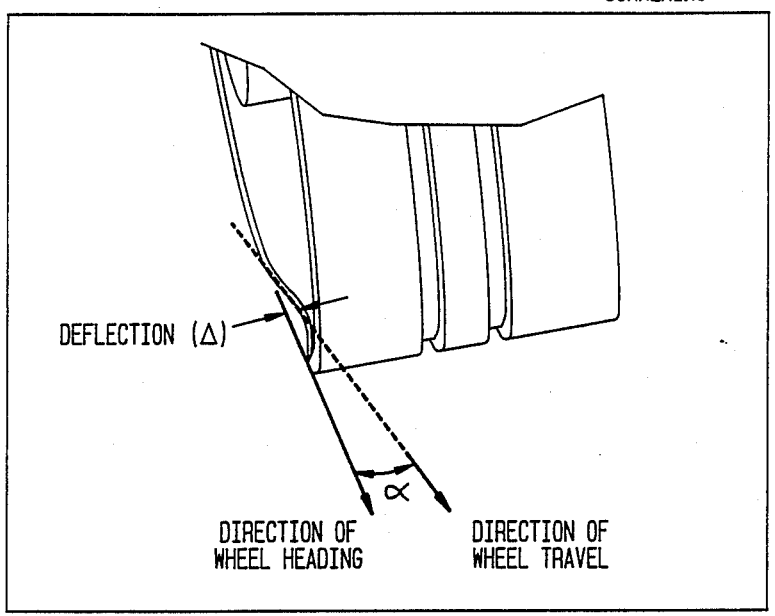
FIG. 12    3.00 TNPT CORNERING
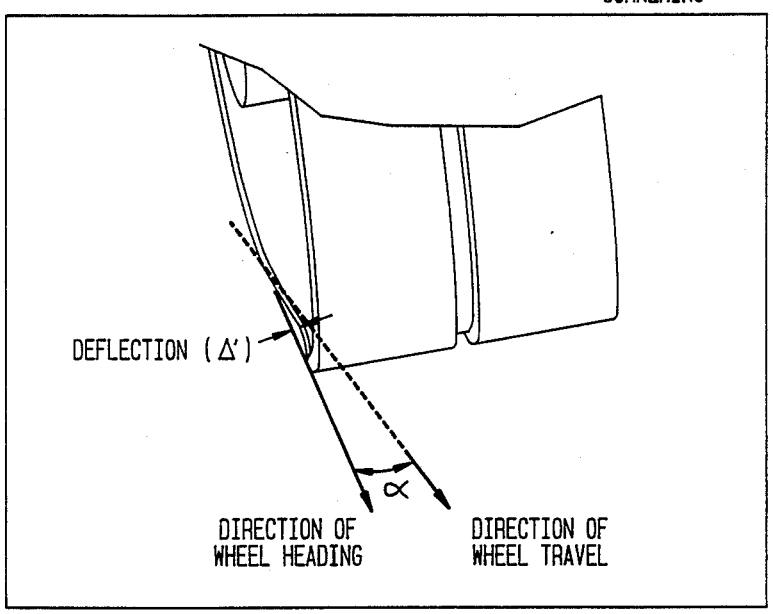

4,921,029

TRAPEZOIDAL NON-PNEUMATIC TIRE WITH SUPPORTING AND CUSHIONING MEMBERS

CROSS REFERENCE TO RELATED APPLICATIONS

This application is a continuation-in-part application of Ser. No. 190,299 filed on May 4, 1988, to be issued as U.S. Pat. No. 4,832,098 and a continuation-in-part application of Ser. No. 787,867 filed on Oct. 16, 1985, now abandoned, and a continuation-in-part application of Ser. No. 600,932 filed on Apr. 16, 1984, also now abandoned.

BACKGROUND OF THE INVENTION

This invention relates to a load-bearing non-pneumatic tire ("NPT" for brevity) having a trapezoidal cross-section and angularly oriented, oppositely directed planar rib members (referred to as "crossed ribs") integrally connected by a web member which makes the NPT non-expansible. By "non-expansible" we refer to the diameter of a wheel fitted with a NPT, which diameter does not get larger when the wheel is rotated, due to the centrifugal forces generated during operation.

The trapezoidal non-pneumatic tire ("TNPT" for brevity) is so configured from an elastomeric synthetic resinous material having specified desirable properties, as to provide optimum handling, cornering and load bearing characteristics for a given mass of resinous material. The term "handling" is used to define the general responsiveness of the vehicle to the expectations of the driver, but more specifically refers to the dynamics of the tires on the vehicle, and in turn, the vehicle itself, due to lateral acceleration. By "elastomeric synthetic resinous material" or "elastomer" we refer to a stiff, resilient, material having specific characteristics defined hereinafter. Rubber, whether natural or synthetic (particularly, styrene-butadiene rubber, SBR), and blends thereof, no matter how blended or vulcanized, is not an elastomer as defined herein, as it fails to meet the criteria set forth herebelow.

In particular, the TNPT provides better handling and cornering than the rectangular non-pneumatic tire ("RNPT") disclosed in the parent case. Either NPT (as used herein the acronym NPT refers to either a RNPT or a TNPT, or both) allows itself to be deformed due to compression, and reverts to its original cylindrical shape while carrying its share of a load, typically as a tire mounted on a wheel rim of an automobile or a motorcycle. The dynamics of such deformation under load determines whether handling is satisfactory or not, such judgment generally being made with respect to a conventional pneumatic tire. Of course, a pneumatic tire has sidewalls which are smoothly and continuously blended into the side edges of its tread.

When the tire of a pneumatic tire is deflected laterally in the inboard direction, the portion of the sidewall nearest the tread comes into contact with the road. By "inboard direction" we refer to the direction in which the vehicle is being turned. With greater deflection, as in a tighter turn at higher speed, progressively more of the sidewall contacts the road. Under the severest conditions, the identifying lettering on the sidewall may be scuffed away by abrasion with the road surface.

Though one might reasonably expect a RNPT to provide optimum handling under lateral acceleration, because of the overall support provided by a rectangular configuration, a RNPT exhibits marginally satisfactory handling when it is used under conditions which generate a high lateral acceleration. Under such dynamic conditions, the entire annular portion of the RNPT in contact with the road, is deflected laterally without benefit of any restraint by its sidewalls, because the RNPT doesn't have any. It will be recognized that the tread of a NPT comes to an abrupt end at each of its shoulders. Under severe cornering conditions, the tread edges of the RNPT are severely abraded.

The unique coaction of the structural elements of the TNPT, by virtue of the distribution of forces due to its trapezoidal shape, provide the TNPT with essentially the same or better deformation and load-bearing characteristics than those of a RNPT having the same mass. Though the ride provided by each belies the stiffness of the elastomeric material and the total lack of air trapped within, the trapezoidal shape of its cross-section provides a unique handling advantage over both a RNPT and a pneumatic tire on a passenger automobile, yet with no substantially noticeable loss of the high degree of comfort provided by the pneumatic tire.

As in a RNPT, the unique open construction of the TNPT dissipates heat generated during continuous cycling between alternating compressive and tensile forces in play during operation. Like the RNPT, the TNPT is ideal for a wide spectrum of wheeled vehicles in which (i) the relatively smaller space occupied by the NPT is desirable, (ii) the susceptibility to puncture is obviated, and (iii) failure of the NPT on special-purpose vehicles such as a personnel carrier due to sudden and serious damage, as for example a bullet, is progressive, rather than sudden, and the effect of such damage is thus minimized.

The overriding advantage of a pneumatic tire is the cushioning it provides, which cushioning, to date, as far as we know, has not been effectively mimiced with a NPT. Its disadvantage is its susceptibility to being punctured. We know of no construction for an elastomeric NPT, other than a RNPT or TNPT, which is reliable and rugged enough to withstand the rigors of normal operation when mounted on the wheel of an automobile.

As will readily be realized, NPTs have been routinely used on vehicles where neither handling, nor cushioning the load is a prime consideration, as for example in fork lift trucks, carts, wheelbarrows, tricycles, and the like. Even so, the use of NPTs in such applications was less than satisfactory because prior art NPTs had undesirable handling characteristics. In addition, one could not provide a variable spring rate in a prior art NPT without changing either its design, that is, its structural configuration, or the materials of its construction. Solid tires, in particular those made from vulcanized rubber, were subject to high heat buildup and subsequent degradation after only constricted usage over a severely limited period. No prior art NPT that we know of suggests an integral NPT with a central web and crossed ribs which are able to deform locally, that is, near the point where the NPT contacts the surface on which it is run, yet discharges its load-bearing and cushioning functions in a manner analogous to that in which a pneumatic tire discharges such functions.

In U.S. Pat. No. 3,188,775 to Cosmos there is disclosed a rubber wheel, he refers to as an expansible sleeve holder, over which an abrasive belt is trained. The wheel is provided with an expansible structure having circumferentially spaced-apart webs in planes at an angle to that passing through the axis of rotation of the wheel, the webs extending radially in a common direction. The angulated webs in the Cosmos wheel, viewed as rib members (ribs), are connected by a planar central web illustrated in the drawing (FIG. 2 of the '775 patent) but not otherwise referred to because the web is an incident of the manner in which the wheel is molded. The ribs provide a specific function, namely to permit the peripheral rim of the wheel to expand due to centrifugal force under which the normally concave ('dished') circumferential surface of the wheel becomes a cylindrical surface.

The open construction of our TNPT not only serves to cool it during operation, but permits an economy of highpriced elastomer. Of course, numerous prior art configurations of tires have sought to economize on material, as for example, illustrated in U.S. Pat. Nos. 1,441,654 and 1,493,923 to Austin, and Deister respectively, without providing the operational characteristics under high lateral acceleration, of our TNPT.

The concept of providing a web in a solid rubber tire is also old, having been taught in German Offenlegungsschrift No. 24 60 051. For additional strength, the upper and lower flanges of the I-beam-like member are connected with interdigitated sinusoidal scallops along its inner surface. This manner of strengthening the structure is quite different from the oppositely directed ribs on either side of the web of the NPT. This reference, and all prior art references failed to recognize the peculiar function of planar oppositely directed angulated ribs which are undercut to help ensure that bending is negated, so that, instead of bending, they will buckle when the critical load is exceeded. It is this peculiar characteristic of compressive deformation of the TNPT in normal use, coupled with buckling of the ribs when the critical load is exceeded, which is instrumental in giving the TNPT 'ride' characteristics which mimic those of a conventional pneumatic tire, and handling characteristics which may improve them.

SUMMARY OF THE INVENTION

It has been discovered that a specific trapezoidal cross-section of a TNPT may be formed having a configuration of oppositely directed ribs flaring outwardly at a trapezoidal angle, and connected to a single circumferential web member ("web"), on either side of it; and the TNPT has better handling characteristics than a RNPT having the same mass. The web of a TNPT has its inner and outer peripheries connected respectively to a relatively narrower inner cylindrical member ("inner hoop"), and to a relatively wider outer cylindrical member ("outer hoop") of the TNPT, intermediate the edges of the hoops. By "trapezoidal angle" we refer to an angle $\theta$ at which the ribs flare outwardly from the circumferential center-line of the hoops. This angle $\theta$ is defined by arc $\tan\theta = [(t_o - t_i)/2]/T$
where $t_o$ is the width of the outer hoop (axial direction), $t_i$ is the width of the inner hooop, and, T is the minimum distance between the radii of the inner and outer hoops where $t_o$ and $t_i$ are measured. The ribs thus flare outwardly at an angle $\theta$ in the range from about 1° to about 40° relative to the vertical; and, they extend at an angle from 15° to 75° relative to radial planes which intersect the ribs at their inner ends; but the ribs are angled in opposite directions. The inner and outer hoops, web, and ribs are all integrally formed as an unitary construction from a stiff, resilient elastomeric material, to form a unique load-carrying structure which, during operation, is non-expansible, yet under lateral acceleration is continuously deformable at the point of contact with the road as the TNPT rotates, so as to provide excellent handling and a low level of road noise, surprisingly like that provided by a pneumatic tire, but without its disadvantages.

It is therefore a general object of this invention to provide a TNPT having a unique arrangement of oppositely directed ribs which flare outwardly at angle $\theta$ from either side of a continuous web between the inner and outer hoops, and intermediate the inboard and outboard edges thereof. The web is perpendicular to the circumferential upper and lower surfaces of the hoops. Such an arrangement results in a TNPT having the aforementioned characteristics, yet is capable of carrying a load of at least 226 kg (500 lbs), when mounted on the wheel of a vehicle operating at speeds up to 128 km/hr (80 miles/hr) for thousands of miles, without being much the worse for wear.

It is a specific object of this invention to provide a TNPT with an "open" or non-compartmentalized structure having a trapezoidal cross-section the sides of which are preferably inclined at an angle $\theta$ in the range from about 10° to about 30° from the horizontal; which TNPT is incapable of trapping air (which air normally provides a cushioning function), and through which structure air circulates freely while the TNPT is in operation, to keep the structure cool; and, which TNPT provides essentially the same or better 'ride' and load-carrying ability as a RNPT of equal mass, but substantially better handling and a lower level of road noise under identical conditions of operation of a vehicle on which a wheel with the TNPT is mounted.

BRIEF DESCRIPTION OF THE DRAWINGS

The foregoing and other objects and advantages of our invention will appear more fully from the following description, made in connection with the accompanying drawings of preferred embodiments of the inventions, wherein like characters refer to the same or similar parts throughout the views, and in which:

FIG. 11 is a perspective view with the upper portion broken away, schematically illustrating a head-on stop-action view of a RNPT on the right front wheel making a left hand turn with a direction of wheel travel which is different from that of wheel heading by angle alpha ($\alpha$) which is great enough to deflect the outer hoop inward (the deflection is $\Delta$) under lateral acceleration.

FIG. 12 is a perspective view with the upper portion broken away, schematically illustrating a head-on stop-action view of a TNPT on the right front wheel of an automobile making the same left turn as that made for the prior illustration, and under identical conditions, showing that the outer hoop is deflected inward to a much lesser extent under the same lateral acceleration.

DETAILED DESCRIPTION OF PREFERRED EMBODIMENTS

It will be evident that the structural details of the TNPT are necessarily tied to its functional characteristics during operation, and these in turn are derived from the materials of choice. Though it may be theoretically possible to provide a corresponding structure in other than an elastomeric material, we know of no way of doing so. We have discovered that it is only in those elastomeric materials which meet the specified properties, that the defined structure will provide the intended function with acceptable results; among such elastomeric materials now known are polyurethanes such as commercially available Adiprene from Uniroyal Chemical Corp., a segmented copolyester such as Hytrel 5556 from DuPont, and a block copolymer of nylon such as Nyrim from Monsanto Chemical Co.

In the best mode of the invention, the elastomer from which the annular resilient body of the TNPT is formed has the following specific characteristics: Shore D hardness from about 40 to 65 (ASTM-D224), more preferably from about 45 to 55; a compression modulus (at 0.5 shape factor and 10% compression) in the range from about 3000 psi to about 20,000 psi, more preferably from about 5000 psi to 15,000 psi, which must not vary ±30% over the temperature range from 20° C. to 70° C. (ASTM-D695); a compression set of less than 60% (ASTM-D395B); a hysterisis (tan $\delta$) of less than 0.25 measured at 70° C. with a Rheometrics machine (ASTM-D2236), more preferably from about 0.05 to 0.15; and flex fatigue of more than 10,000 cycles at a maximum strain of 20% under normal operating conditions ('Texus' flex test, ASTM-D3629-78)). Such materials are polyurethane, or, segmented copolyesters believed to be prepared by ester interchange of dimethyl terephthalate and isophthalate with polytetramethyleneether glycol and excess 1,4-butanediol, or, block copolymers of nylon with rubber.

Figure 3:
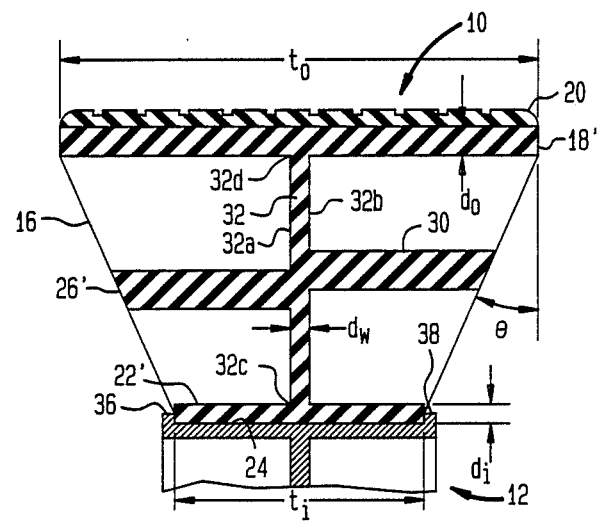
FIG. 3 is a sectional elevation view taken along the line 3—3 of FIG. 2, showing a TNPT with a central planar web member integral with the ribs which run on either side, and join the inner and outer hoops below and above.
Figure 4:
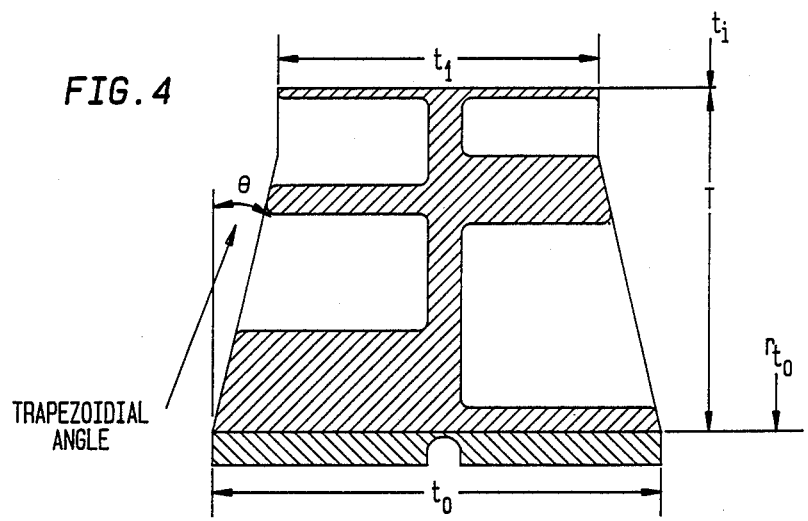
FIG. 4 is a fragmentary side elevation view of another embodiment of an unmounted TNPT, showing angled ribs commencing to flare at angle $\theta$ at the inner circumference of the outer hoop, and ending at a point at a radius greater than the inner radius of the inner hoop; all the ribs on one side, including the flared portions lie in the same inclined plane, so that the unflared rib portion adjacent the inner hoop is seen as a vertical end portion in the elevational view. Thus the stress at the root (where the rib joins the inner hoop) of the unflared portion of each rib is decreased compared to the stress generated at the root of a rib adjacent the inner hoop in the embodiment shown in FIG. 3.
Figure 5:
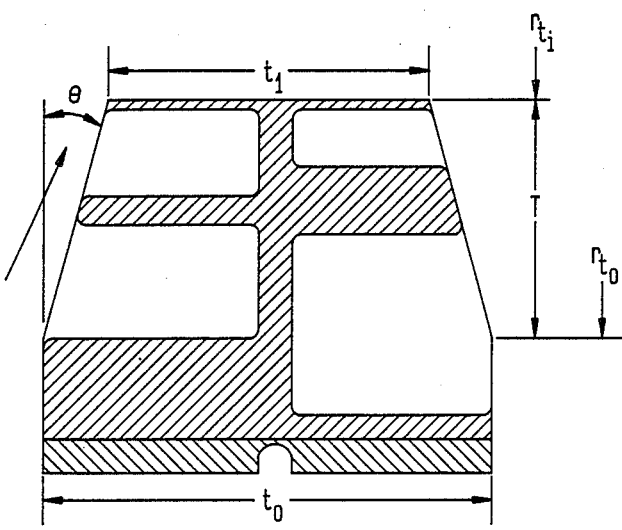
FIG. 5 is a fragmentary side elevation view of still another embodiment of an unmounted TNPT, showing angled ribs commencing to flare at angle $\theta$ at the outer circumference of the inner hoop, and ending at a radius less than that of the outer hoop; now, the unflared rib portion adjacent the outer hoop is seen as a vertical end portion in the elevational view. Thus the stress at the root at the outer hoop is decreased compared to the stress generated at the root (at the outer hoop) in the embodiment shown in FIG. 3.
Figure 6:
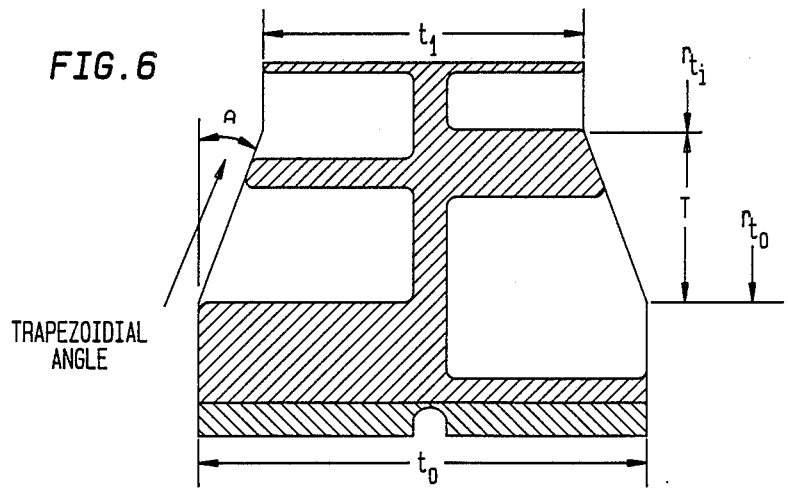
FIG. 6 is a fragmentary side elevation view of yet another embodiment of an unmounted TNPT, showing angled ribs commencing to flare at angle $\theta$ at a point greater than the radius of the inner hoop and ending at a point at a radius less than the inner radius of the outer hoop; now the unflared rib portions adjacent the hoops are seen as vertical end portions in the elevational view. Thus the stress at the root of the unflared portions of each rib is decreased compared with the stress generated at the roots of each rib in the embodiment shown in FIG. 3.

The outer hoop may typically be provided with a rubber tread on the hoop's outer surface. The inner hoop is coaxial but not coextensive with the outer hoop, that is, the width ( or length, measured in the axial direction) of the inner hoop is less than that of the outer hoop. The net result is that the ribs are outwardly flared as seen in FIG. 3, because the ribs are continuously angled outwardly (relative to a vertical central plane through the web) from the inner hoop to the outer hoop. The same result, namely outwardly flaring ribs, may be produced with ribs flaring outwardly at angle $\theta$ in an angulated plane, even if the ribs terminate in one or more short vertical segments as illustrated in FIGS. 4-6.

The hoops are circular bands, much wider (that is, longer, in the axial direction) than they are thick (measured in the radial direction). The inner surface of the inner hoop is securely mounted on the rim of a wheel, so that the TNPT, with a tread, may be used much the same way as a RNPT, or, a conventional pneumatic tire. Most preferably, the inner hoop is bonded to the rim, either by the adhesive strength of the polyurethane, or with an additional adhesive, so that mechanical fastening of the TNPT to the rim is unnecessary.

In one preferred embodiment, the outer hoop is spaced apart from the inner hoop by a plurality of circumferentially spaced-apart planar ribs and a single central planar web, all of which are formed as a unitary construction. The single web connects the inner and outer hoops at their inner ends, that is, along the circumferential centerline of the TNPT, so that, if there were no ribs, the shape would be that of an I beam formed into a circle, the inner flange being narrower than the outer.

The ribs extend as front and rear sets of ribs, on either side of the single web, the front set angled in the range from about 15° to 75° to the radial planes which intersect the ribs in one direction, the rear set angled in the same range but in the opposite direction. Preferably, the ribs are oppopsitely directed at an angle in the range from about 30° to 60°.

The unitary structure of the TNPT is configured so that the web and rib members provide a load-carrying structure with continuous deformation due to compression of the TNPT as it rotates during operation. The thickness of the web, the ribs and the hoops are such that there is essentially no detectable expansion of the tire during operation; but in addition to deformation without buckling, due to compression during normal operation, the TNPT is configured to allow the ribs to buckle, either individually or severally, when the TNPT runs over a sudden projection in the road's surface. The word "buckle" as used herein is defined as a relatively sudden and radical deformation as a result of compression loading that exceeds a certain critical load value (hereinafter referred to as $P_{cr}$).

Figure 1:
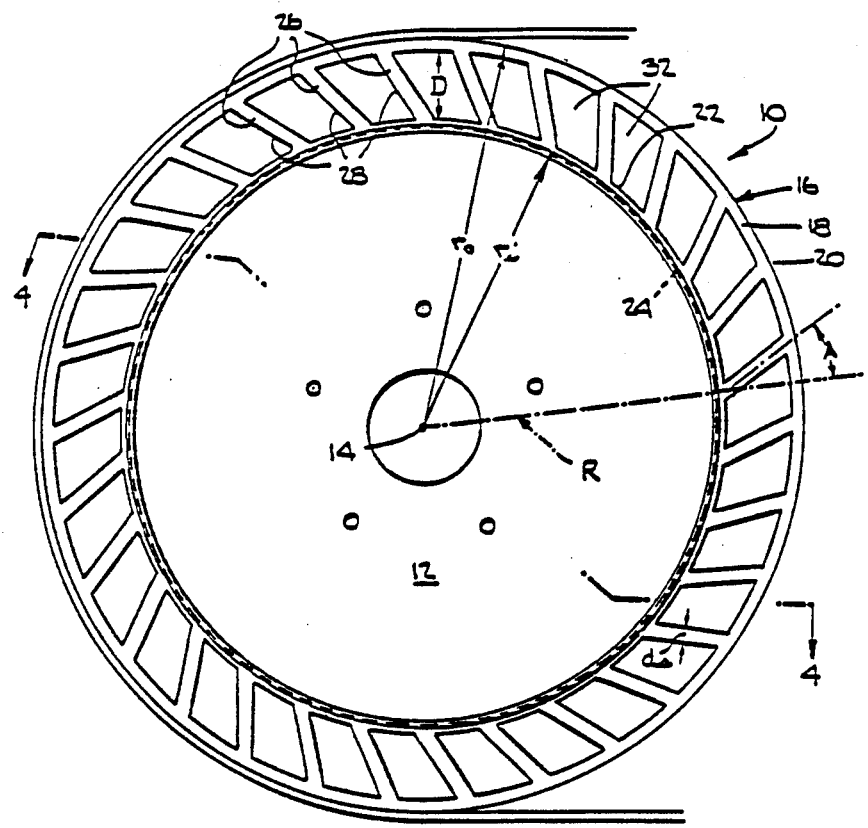
FIG. 1 is a side elevation view of a prior art wheel over which a grinding belt is trained, the wheel having a central metal portion (corresponding to a "rim" of a vehicle's wheel) and, an elastomeric annular body portion (corresponding to a "tire") having angularly inclined rib elements, all inclined from radial planes through the wheel, and in the same direction, so that the diameter of the wheel expands due to centrifugal force generated when the wheel is rotated.

Referring to the prior art Cosmos expansible sleeve holder schematically illustrated in FIG. 1, indicated generally by reference numeral 10, there is shown an annular body 16 of vulcanized rubber, the only material specified by Cosmos, mounted on a flanged steel wheel rim 12 provided with through-passages 13 for mounting on a shaft to be rotated about the axis 14. Inner hoop 22 is secured by its inner surface to outer surface 24 of the rim 12. Outer hoop 18 of the annular body is spaced apart a distance D from the inner hoop by a thin, membranous web 32 and angulated planar ribs 26, each of which ribs extends axially between hoops 18 and 22 for their axial lengths (measured along the axial direction).

ribs, angle A, is between 15° and 75°, with respect to the radial plane R, all the ribs being angulated in the same direction. The ribs 26 have a thickness $d_s$ measured in a direction perpendicular to its length (measured along the axis), and an end-to-end length L in the angular direction. The ribs and hoops are connected by a web 32 formed at the parting line of molds in which the wheel is molded, and therefore is positioned midway between the axial ends of the inner and outer hoops. Since the web 32 is formed as "flash" at the parting line of the mold, the web is a thin extensible rubber membrane, and because the ribs are angulated unidirectionally, the diameter of the wheel, and its outer radius $r_o$, expands upon rotation, though the inner radius $r_i$ of the annular body does not, because it is secured to the wheel rim. Since the material of the annular body is vulcanized rubber and the ribs 26 are angulated in a common direction, the wheel has essentially no ability to carry a load supported on an axle to which the wheel rim 12 is bolted. However, it is particularly well-adapted to support and hold on its cylindrical outer surface the abrasive sleeve or belt 21 which will not slide off because of the centrifugal force generated when the wheel is rotated at high speeds. The hoop spacing, that is, the distance between the inside surface of the outer hoop 18 and the outside surface of the inner hoop 22 is D. To provide a flat cylindrical surface wide enough to support the belt uniformly when the wheel expands, the outer surface 19 of the outer hoop 18 is concave when the wheel is at rest, though this dished surface is not shown.

Figure 2:
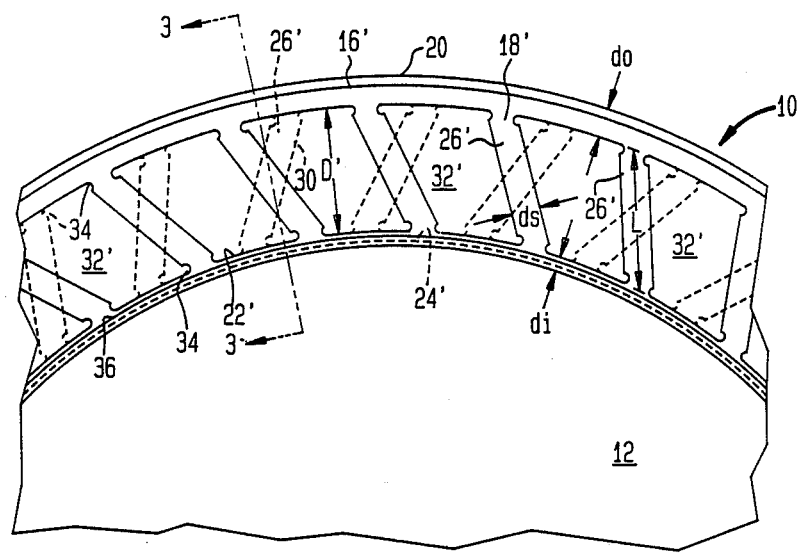
FIG. 2 is a fragmentary side elevation view of a portion of the annular body of the non-expansible TNPT of this invention mounted on a wheel rim, showing oppositely directed planar ribs formed integrally with a planar web member about midway between the outer edges of inner and outer cylindrical members ("hoops"), which in combination coact as a unit construction to function as the TNPT. The elements in FIG. 2 corresponding to FIG. 1, are primed.

Referring to FIG. 2 there is shown an elevational view, with portions broken away, of a wheel indicated generally by 10', including the TNPT 16' of this invention, molded from polyurethane and mounted on wheel rim 12. In addition to planar first ribs 26' (referred to as a front set) are additional second ribs 30 which constitute a rear set, so referred to because the front and rear sets of ribs are integrally connected by the web 32' having a thickness $d_w$, which web also connects the outer and inner hoops 18' and 22' as in FIG. 1. The term "integral" refers to the TNPT being formed as a whole, and the term "unitary" describes the interaction of the component structural elements as a unit. The terms together emphasize the molding or casting of the inner and outer hoops, the web and the ribs as a single construction using the elastomer, and the coaction of these structural elements of the TNPT to discharge its stated functions. The hoop spacing is D'.

The ribs 30 (shown in phantom outline) are of equal length L and oppositely directed to ribs 26, but at the same angle, for convenience in the molding of the TNPT, though both the lengths L and the angulation of the ribs may be different as long as they are oppositely directed. When oppositely directed, it is preferred that a front rib 26' cross at least one rear rib 30, resulting in a "crossed" rib structure for optimum stiffness and load-carrying ability. The ribs 26' having a thickness $d_s$ measured in a direction perpendicular to its length (measured along the axis), and an end-to-end length L in the angular direction, are preferably undercut at 34, as shown, where their ends meet the inner and outer hoops 22 and 18 respectively, to enhance flexibility of the connection, thus facilitating compression of the ribs 26' and 30 without bending as each portion of the circumference of the TNPT contacts the ground while the vehicle on which the TNPT is mounted travels over the ground.

Referring now to FIG. 3, the web 32' is positioned midway between the axial ends of the inner and outer hoops 18' an 22', and connected at its (the web's) inner periphery 32c to the inner hoop 22, and at its outer periphery 32d to outer hoop 18, so that the edge of rib 26' lies along one side face 32a of the web. All the first ribs 26' (front set) are similarly connected, so that all ribs are angled at angle A in the same direction. In an analogous manner, all the second ribs 30 (rear set) are connected at their corresponding inner and outer ends to the inner and outer hoops and their edges lie along the face 32b of the web, so that all the ribs 26' and 30 are angled at substantially equal angles A, but the first ribs are directed oppositely to the second ribs.

When the TNPT is to be used as a tire for an automobile or truck, the TNPT is provided with a rubber tread 20 secured to the outer circumferential surface of the outer hoop 18. The stiffening function of the web 32 in combination with the crossed ribs is more clearly evident in FIG. 3. The web tends to prevent the ribs from deforming by being bent along L, but allows compressive deformation of the TNPT in the area around the point of contact with the ground. The ribs, in turn, prevent the web from buckling in the axial direction until $P_{cr}$ is reached, so that the web and crossed ribs cooperate to carry the load. Changing the angle A of the ribs effectively varies the spring rate without changing the dimensions of the structural components of the TNPT, or the composition of the elastomer from which it is molded.

The ability of the TNPT to be deformed yet return to its cylindrical shape, essentially instantaneously, under compression and sudden transitions of loading, requires that the TNPT withstand a maximum strain of 20% during normal operation over several thousand miles, yet buckle locally to absorb the sudden impact of a projecting object, or road surface irregularity. It is this unexpected ability derived from its unique construction from the elastomer which gives the TNPT the handling and ride characteristics deemed essential in a conventional pneumatic tire.

The particular design of the essential deformability and buckling characteristics of the TNPT which imbue it with the ability to mimic the ride and handling characteristics of a convention pneumatic tire, may be varied not only by changing the dimensions of the ribs and web, and the dimensions and relative disposition of the ribs, but also by varying the radius of the undercuts 34 which preferably range from 0.125" to 0.5" on the acute angle junctions of the ribs with the inner and outer hoops; and, from 0.25" to 1" on the obtuse angle junctions of the ribs with the inner and outer hoops. It is most preferred to undercut only one end of each rib only in the acute angles where that rib joins the inner hoop and outer hoops, though in the Figs the ribs are illustrated with undercuts also in the obtuse angles.

An annular body of a TNPT for a luggage cart, fork lift, an automobile tire or spare tire, or insert for a pneumatic tire designed to have "run-flat" operation, is formed with dimensions, dimensional relationships, and angular relationships which fall within the preferred ranges set forth in the following Table.

TABLE 1

| Item | Preferred range |
|---|---|
| $r_o$ | 4" to 18" |
| A | 20° to 60° |
| $d_i$, $d_o$ | 0.0312" to 0.5" |
| D | 1" to 4" |
| $r_o/D$ | 1 to 18 |
| $D/d_w$ | 10 to 2.5 |
| L (value of L depends on the values chosen for A and D) | |
| $L/d_s$ | 2 to 40 |
| $t_i$, $t_o$ | 1.5" to 7" |
| $r_i$ | 2" to 16" |

FIG. 3 illustrates a crossectional elevational view of a mounted TNPT, and FIGS. 4-6 illustrate crossectional elevational views unmounted TNPTs in each of which a web is positioned mid-way between the outer edges of the inner and outer hoops, respectively, so that the ribs are disposed symmetrically about the common circumferential center-line of the hoops, but the ribs on one side being oppositely directed relative to the ribs on the other. The central web is normal, that is perpendicular to both the inner and outer hoops.

FIG. 3 illustrates the ribs flaring continuously outwardly commencing at the inner hoop and terminating at the outer hoop. FIGS. 4-6 illustrate the ribs flaring outwardly, commencing to flare at different locations. In each of these embodiments flaring of the ribs does not commence and terminate at the inner and outer hoops of the TNPT. The precise geometry of the ribs may be tailored to provide desired buckling and cushioning, inter alia, which determine the 'ride' and 'handling' charcteristics of the TNPT. The ribs may be undercut if desired, and the undercuts may be provided at more than one location on each rib, so that the undercuts determine where the ribs buckle.

Figure 7:
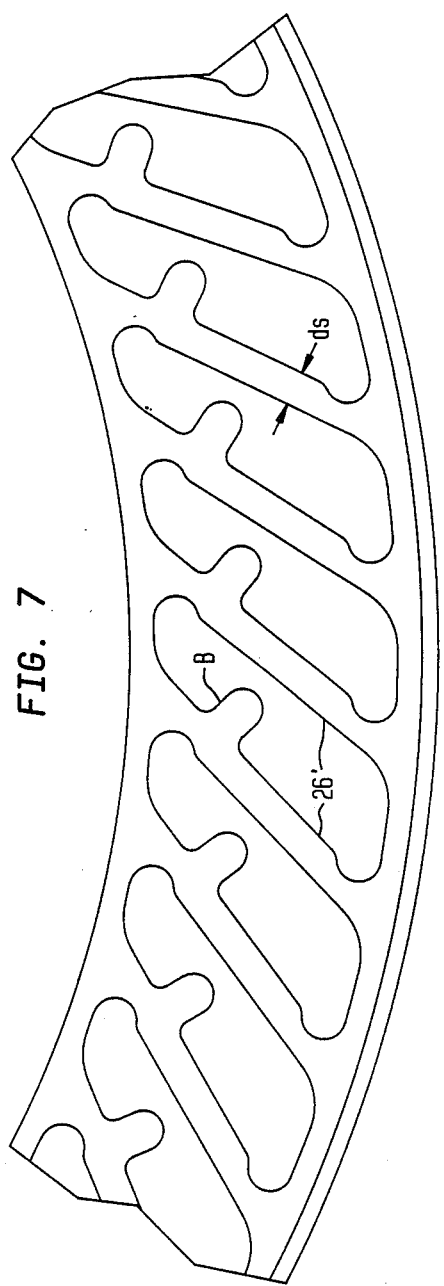
FIG. 7 is a fragmentary side elevation view of a portion of the annular body of still another embodiment of an unmounted TNPT, showing "bump-stops" projecting from a point intermediate the length of each of the oppositely directed planar ribs, so as to be downwardly inclined from the horizontal and contact a next-adjacent rib when the TNPT is severely buckled as when the TNPT goes over a bump in the road; the bump-stops, ribs, web and inner and outer hoops, as before, are all integrally formed.
Figure 8:
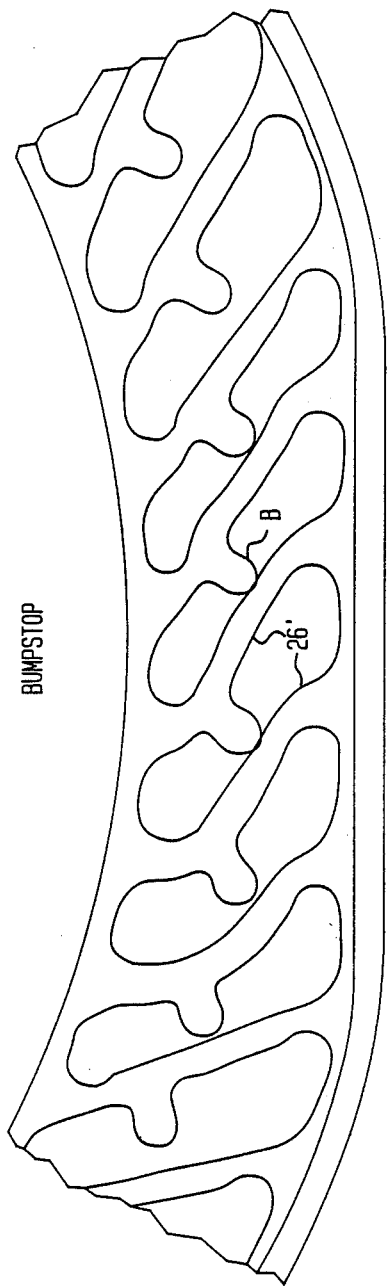
FIG. 8 is a fragmentary side elevation view of the TNPT shown in FIG. 7, after it buckles severely enough to cause the bump-stops to bump against next-adjacent ribs in the ground-contacting portion of the TNPT.

FIGS. 7-8 illustrate an embodiment of the TNPT in which the ribs are provided with "bump-stops" on their lower surfaces, so that in normal operation, the bump-stops may or may not abut the next adjacent rib, depending upon the applied force. Where the force is sufficiently high to cause the bumpstop of one rib to be pressed against the next adjacent rib, as shown in FIG. 8, the deflection of the ribs under severe buckling conditions is lessened.

Figure 9:
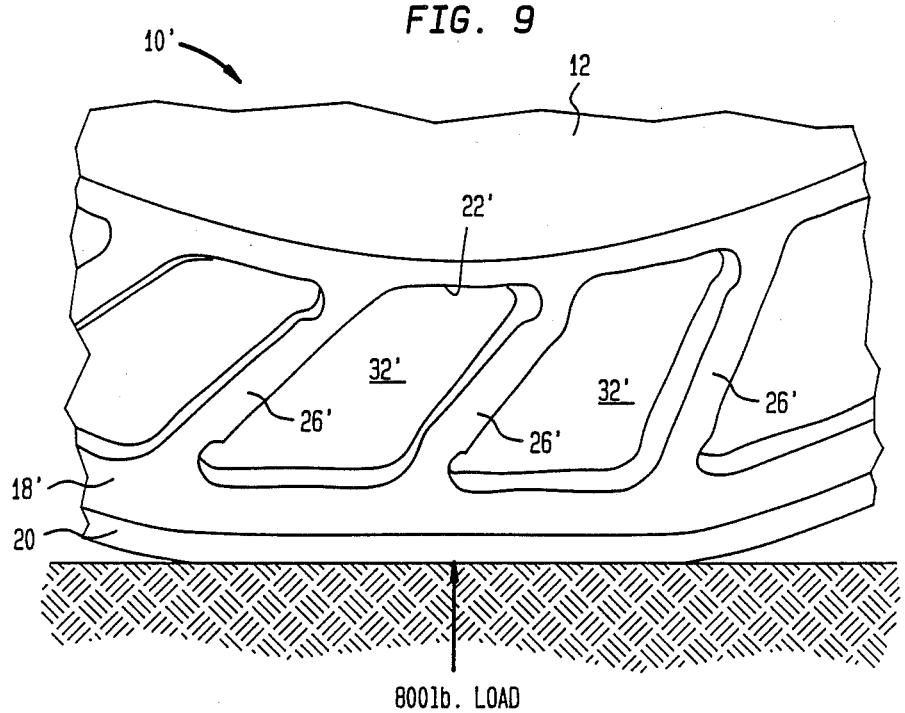
FIG. 9 is a fragmentary side elevation view of a portion of the annular body of a TNPT schematically illustrating a stop-action of its ground-contacting portion in normal use on an automobile travelling on a relatively smooth surface.

Referring now to FIG. 9, a portion of the TNPT is shown as it undergoes normal compressive deformation during operation of a vehicle over a smooth road surface. The loading force on the TNPT is approximately 800 lb (363 kg). The ribs 26' and the crossed rib immediately behind rib 26' most directly support the major portion of the load, and are under sufficient compression to decrease the overall lengths of the ribs. In a typical instance, the unloaded ribs are each 2.12" (5.83 cm) long, while the loaded ribs are 1.99" (5.05 cm) long.

While the ribs 26' and 30 are compressed in the ground-contact area during operation, the web 32' connecting the ribs in this area is subjected to both compression and shear forces, and might even be subjected to tensile forces. The web 32' and ribs 26' and 30 thus interact to distribute the loading forces.

The TNPT will most closely approximate the ride characteristics of a pneumatic tire if the ribs are constructed to reach $P_{cr}$ when the load exceeds the total load which then causes the NPT to undergo a deflection which is between 6% and 12% of tire section height ($SH = r_o - r_i$). This means that when the tire undergoes a load that causes D to compress beyond 6% of the original D, then the tire reaches $P_{cr}$ and buckles. This may be expressed as follows:

$$0.06 < \frac{P_{cr}/K}{SH} < 0.12$$

wherein
0.06 = 6% deflection
0.12 = 12% deflection
$P_{cr}$ = critical buckling load
K = spring rate of NPT, and
SH = section height.

The TNPT weighs less, and can be stored in a smaller space than a comparable conventional inflated pneumatic spare tire. The space and weight objectives for a compact spare tire are best met if the total material volume (space occupied by the material of the TNPT) divided by total projected volume (space between the outer surface of the outer hoop and the inner surface of the inner hoop) is between 20% and 60%.

Another desirable characteristic of any tire is an overall spring rate which changes depending upon the type of surface against which the tire is loaded. Specifically, it is desirable that the spring rate be lower over a bump or article obstructing the path, than over a flat surface. In the TNPT the desirable ratio of spring rate over a flat surface divided by spring rate over a 0.5" (1.27 cm) thick cleat which spans the width of the tire, is between 1.4 and 6.0, preferably between 2 and 4.

The annular body 16' may be adhered to the surface 24 of wheel rim 12 by being molded directly thereto in a conventional liquid molding process, with the outer surface 24 having been prepared in a known manner to receive and secure the elastomer used. Preferably the wheel rim 12 is provided with flanges 36 and 38 which cooperate with the mold to form the annular body 1' on surface 24. Any conventional method for molding polyurethane may be used to form the TNPT, such as one described in aforementioned copending U.S. Ser. No. 190,299 the disclosure of which is incorporated by reference thereto as if fully set forth herein.

The following illustrative example 1 provides details of a molded polyurethane TNPT in which the tread is prepositioned in the mold and adhesively secured to the TNPT.

EXAMPLE 1

A. Molding the annular body of the TNPT, then adhesively securing it to a wheel rim, and adhesively securing a tread to the outer surface of the TNPT:

A TNPT was conventionally molded in a mold having an inner mold ring by filling the mold with a reaction mixture of (a) toluenediisocyanate-poly(tetramethyleneether glycol (M.W. about 2000) (TDI-PTMEG) prepolymer having a NCO number of 6.5, and (b) a methylene-bis-orthochloroaniline (MBOCA) curative the (a/b) weight ratio being 1/0.21. Prior to mixing the foregoing components, the TDIPTMEG is heated to 70° C. and the MBOCA is heated to 120° C. The mold is also heated to 100° prior to introducing the reaction mixture.

The liquid reaction mixture is poured into the mold with care being taken to ensure that all the air in the mold is displaced by the liquid.

Once the mold is filled it is placed for about 15 min in an oven (set for 110° C.) to cure the polyurethane. Subsequently, the mold is opened and the annular body removed and post-cured for about 16 hr at 110° C. The TNPT formed has ribs which are undercut in the acute angle at the inner hoop, and in the corresponding obtuse angle on the other side of the rib where it meets the outer hoop.

A rubber tire tread having a thickness of about 0.6" is then adhered to the outer surface of the outer hoop 18' using a methyl 2-cyanoacrylate adhesive and the resulting tire is fitted and adhered to a steel rim 12 using a polyurethane urethane adhesive cured with an organic isocyanate curative. The resulting tire and wheel assembly was used to replace a conventional passenger car tire and wheel assembly. A car equipped with this tire and wheel assembly was driven at speed up to 40 mph (64 km/hr) without deleteriously affecting control of the car and without damage to the TNPT.

The TNPT has the following dimensions:

| | | |
|---|---|---|
| $r_i$ | 8.05" | (20.45 cm) |
| $r_o$ | 10.5" | (26.04 cm) |
| A | 45° | |
| $d_i, d_o$ | 0.2" | (0.51 cm), and 0.14" (0.356 cm) |
| D | 1.9" | (4.82 cm) |
| $r_o/D$ | 5.5 | |
| $D/d_w$ | 9.5 | |
| L | 2.2" | (5.59 cm) |
| $L/d_s$ | 8.5 | |
| $t_i$ | 2.0" | (5.08 cm) |
| $t_o$ | 3.0" | (7.62 cm), each |

A number of Federal Motor Vehicle Safety Standard 109 tests, details of which are incorporated by reference thereto as if fully set forth herein, were conducted on each of several 106-ribbed TNPTs and one RNPT, and the results of the tests averaged. The TNPTs have varying tread widths, so that the ratio of the tread width to that of the inner hoop is in the range from 1.0 (for the RNPT) to 1.61. All tires have the same inside diameter of the inner hoop, and substantially the same mass.

The cornering coefficient is a quantitative measure of "handling". The cornering coefficient is measured as the ratio of lateral force to radial force at the designated slip angle of either 1° or 4°.

The stepped up speed (SUS) measurements are a measure of high speed endurance under conditions of severe heat buildup. Performance of the tire under SUS conditions is measured sequentially under constant load which is 92% of the tire's 100% load rating. The test is conducted by commencing at 50 mph for 2 hr. After 2 hr, the speed is raised to 75 mph; and thereafter, at increments of 0.5 hr, the speed is raised in increments of 5 mph, so that at 5 hr the speed is 100 mph.

The stepped up load (SUL) measurements are a measure of load-carrying capability for long term endurance. Performance under SUL conditions is measured in the following steps, sequentially at constant speed of 50 mph for 4 hr at 85% load; for 6 hr at 90% load; for 24 hr at 100% load; then increasing in equal increments of 10% for equal 8 hr increments thereafter.

TABLE 2

| Tread width (ins) | Cornering Coeff. | | SUS (hr) | SUL (hr) | Width ratio Tread/Inner hoop |
|---|---|---|---|---|---|
| | *s.a. 1° | s.a. 4° | | | |
| 2.68 | 0.158 | 0.472 | 5.3 | 58.5 | 1.0 |
| 2.68 | 0.155 | 0.445 | 4.6 | 52.6 | 1.34 |
| 3.02 | 0.187 | 0.515 | 5.3 | 74.2 | 1.5 |
| 4.02 | 0.216 | 0.572 | 5.3 | 75.0 | 1.61 |

*s.a. = slip angle

It is evident that the cornering coefficient increases as ratio of (tread width/inner hoop width) increases, whether the slip angle is 1° or 4°. The unexpected increase of the cornering coefficient with increasing ratio is attributable to the stabilization of the outer hoop carrying the tread. As a RNPT negotiates a corner, the outer hoop is deflected laterally inboard, in turn resulting in the inboard deflection of the ribs. The inner ribs then lift the inboard portion of the tread surface off the road surface, leaving a diminished tread surface area in contact with the road, in turn, resulting in decreased road holding as the lateral acceleration increases. With the TNPT occurence of this phenomenon is postponed to a higher lateral acceleration than that at which it occurs for the RNPT. The resulting better handling experience with the TNPT is attributable to the increased deflection necessary to cause the outer edges of the outer spokes to deflect pass the vertical axis.

This phenomenon is schematically illustrated in a series of illustrations duplicating stop-action photographs taken from a recording on a 0.5" VHS video camera. The photographs were made with the video camera mounted on an automobile ("auto" for brevity) and aimed at the right front wheel as the auto was making a hard left hand turn at between 60-70 mph.

Figure 10:
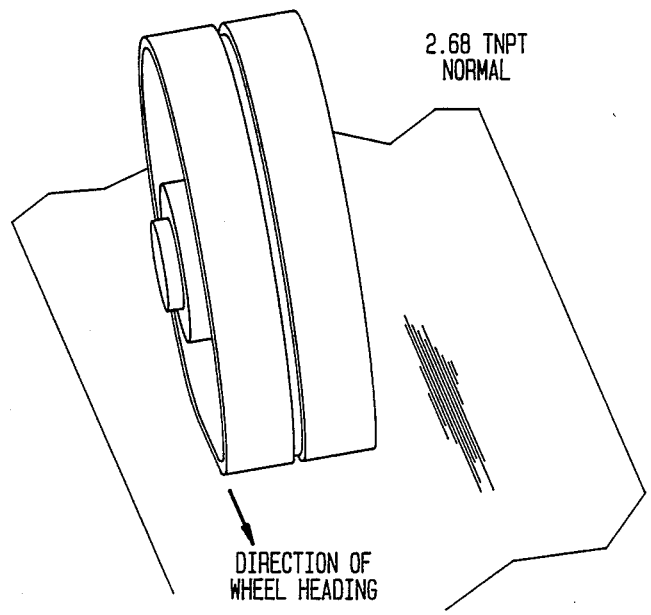
FIG. 10 is a perspective view with the upper portion broken away, schematically illustrating a head-on view of a TNPT travelling straight ahead, this being the direction of wheel heading.

FIG. 10 shows a TNPT having a tread width of 2.68 inches and an outer diameter 85% of a pneumatic tire used on the test automobile, mounted on the same auto, and driven in a straight ahead direction, that is, with the direction of wheel heading directly forward.

A conventional radial steel belted pneumatic tire, or a RNPT, driven in the straight ahead direction, presents substantially the same view as that shown in FIG. 10. However, under hard cornering conditions, the pneumatic tire may be deflected laterally sufficiently so that the sidewall is in contact with the road surface. This results in an exaggerated bulge in the sidewall due to transient increased loading which occurs at the same time as the deflection.

FIG. 11 shows a RNPT having a tread width of 2.68" in a hard cornering situation sufficient to have a pneumatic tire (had one been used) deflected laterally sufficiently so that its sidewall contacts the road surface. The deflection obtained is $\Delta$, this being the distance of the top of the arc of the deformed TNPT, from the line of the direction of wheel heading, and this deflection is relatively large, the tread appearing to have been 'sucked' underneath and inboard the turning wheel.

FIG. 12 shows a TNPT having the same mass as the one shown in FIG. 11, so that the ratio of tread width to inner hoop is 1.5, powered through the same turn in the road at the same speed as used for the conditions depicted in FIG. 11. As is visually evident in the reproduction of the photograph, the lateral deflection $\Delta$ is relatively small compared to that obtained with an RNPT having the same mass.

A trapezoidal angle $\theta$ in the range from about 15° to about 25° is more preferred. Least detrimental to the durability of the TNPT is $\theta$ in the range from 20° to 22°.

In addition to better handling than is obtained with a RNPT, another advantage of the TNPT is that a TNPT of equivalent mass as the RNPT has lower rolling resistance, improved wear, and reduced abrasion of the tread center during locked wheel skids. These advantages are attributable to the reduced contact pressure of the wider TNPT footprint compared with that of a RNPT of equivalent mass.

Yet other unexpected advantages of the TNPT are better "off-road-recovery" and "nibbling" performance. Off-road recovery is experienced when a tire is driven off the road surface onto the shoulder of the road, the surface of the shoulder being at a slightly lower elevation than the road surface. The security and ease with which the wayward tire is returned to the road surface is a measure of its off-road recovery. A TNPT exhibits improved off-road recovery compared to that exhibited by a RNPT because the outermost tread edge has a smaller vertical force of reaction directly over the edge, resulting in less steering input (or angle of incidence) to scale the step-off in the surfaces.

"Nibbling" is a phenomenon which is experienced when a tire, without steering input, tends to follow a seam or groove which is parallel to the direction of travel, and a physical feature (defect) in an otherwise smooth road surface. The TNPT exhibits improved nibbling performance compared to that exhibited by a RNPT of equivalent mass. Due to the greater flexibility of the outer edges of the tread, the TNPT does not conform to a parallel seam or groove with the same determination as does the RNPT. Rather, the TNPT rides over the seam or groove with minimal re-direction of the vehicle to maintain its path.

From the foregoing detailed description it will now be evident that the structure of the TNPT of our invention is unique in that it is deliberately designed to buckle under specified conditions to provide the characteristics essential to mimic a conventional pneumatic tire. This unique construction demands that the ribs be angulated and they be compressible, rather than bend under load. The resulting "open" structure not only provides the essential ride and handling characteristics but allows the TNPT to dissipate heat during operation. The foregoing characteristics are lacking in any logical combination of the teachings of prior art references, each of which is conceptually so different that combining their teachings simply magnifies not only their conceptual differences but also the interaction of the structural elements which produce them.

Having thus provided a general discussion of the problem addressed and solved in our invention, specific illustrations of the best mode of our NPT, and a demonstrative comparison of our TNPT with relevant prior art wheels, it is to be understood that no undue restrictions are to be imposed by reason thereof except as provided by the following claims.

INDEX OF DEFINITIONS OF SYMBOLS

A is the rib angle; $\theta$ is the trapezoidal (flare) angle $\alpha$ (alpha) is change in direction of wheel heading;

$\Delta$ (delta) is deflection of the tread;

$r_i$ and $r_o$ are the radii of the inner and outer hoops respectively;

D is the difference between $r_o$ and $r_i$;

$d_i$ and $d_o$ are the thicknesses of the inner and outer hoops respectively;

$d_w$ is the web thickness; $d_s$ is the rib thickness;

L is the length (between hoops) of a rib; and, $t_i$, $t_o$ are the rim width and tread width, respectively.

We claim:

1. In a non-pneumatic tire rotatable about an axis, said tire comprising an annular body of resilient elastomeric material, said body consisting essentially of a generally cylindrical outer member at the outer periphery of said body, a generally cylindrical inner member spaced radially inward from and coaxial with said outer member, a plurality of axially extending, circumferentially spaced-apart first and second rib members connected at their corresponding inner and outer ends to said inner and outer cylindrical members, said rib members being generally inclined at an angle of from about 15° to 75° to radial planes which intersect them at their inner ends, and a unitary circumferential web member having opposite side faces, said web member having its inner and outer peripheries connected respectively to said inner and outer cylindrical members, said web member being connected on one side face to said first rib members and on the other side face to said second rib members, said first rib members being directed oppositely to said second rib members with respect to said radial planes, to form with said inner and outer cylindrical members and said web member, a load-carrying structure which provides locally loaded members adapted to buckle, the improvement comprising, said non-pneumatic tire having a trapezoidal cross-section in which said ribs flare outwardly from the circumferential center-line of said inner and outer cylindrical members, at an angle $\theta$ defined by $$\arc \tan\theta = (t_o - t_i)/2]/T$$

where $t_o$ is the width of the outer cylindrical member, $t_i$ is the width of the inner cylindrical member, and, T is the distance between the outer surface of the inner cylindrical member and the inner surface of the outer cylindrical member, said angle $\theta$ being in the range from about 1° to about 40° relative to the vertical plane through the circumferential centerline of said cylindrical members.

2. The tire of claim 1 wherein said web member is planar, is perpendicular to the rotational axis of the tire and is positioned about half way intermediate the axial ends of said cylindrical members, and wherein each of said rib members extends axially from the opposing side faces of said web member.

3. The tire of claim 1 wherein said first and second rib members flare outwardly continuously from said inner cylindrical member to said outer cylindrical member so as to present a generally trapezoidal cross section in an axial plane, and said ribs are undercut at each end of each rib at least in the acute angle where said each rib joins said inner and outer cylindrical members.

4. The tire of claim 2 wherein said ribs are angulated so that said angle $\theta$ commences to flare at the inner circumference of the outer cylindrical member, and ends at a point at a radius greater than the inner radius of the inner cylindrical member, all the ribs on one side of said web member, including the flared portions of the ribs, lying in the same inclined plane, so that the stress at the root of the unflared portion of each rib is decreased, compared to the stress generated at the root adjacent the inner member of a rib which is continuously flared from inner to outer member.

5. The tire of claim 2 wherein said ribs are angulated so that said angle $\theta$ commences to flare at the outer circumference of the inner cylindrical member, and ends at a point at a radius less than the inner radius of the outer cylindrical member, all the ribs on one side of said web member, including the flared portions of the ribs, lying in the same inclined plane, so that the stress at the root of the unflared portion of each rib is decreased, compared to the stress generated at the root adjacent the outer member of a rib which is continuously flared from inner to outer member.

6. The tire of claim 2 wherein said ribs are angled so that said angle $\theta$ commences at a point greater than the radius of the inner cylindrical member, and ends at a point at a radius less than the inner radius of the outer cylindrical member, all the ribs on one side of said web member, including the flared portions of the ribs, lying in the same inclined plane, so that the stress at the root of the unflared portion of each rib is decreased compared to the stresses generated at the roots adjacent the inner and outer members of a rib which is continuously flared from inner to outer member.

7. The tire of claim 2 wherein said ribs have bump-stop members projecting from a point intermediate the length of each of the oppositely directed planar ribs, so that said bump-stop members are downwardly inclined from the horizontal, and to contact a next-adjacent rib when said tire is severely buckled.

8. The tire of claim 2 wherein said angles are substantially equal and in the range from 20° to 60°.

9. The tire of claim 2 wherein said outer cylindrical member has secured to its outer surface, a circumferential tread; and, said inner cylindrical member has secured to its inner circumferential surface, a wheel rim.

10. The tire of claim 2 wherein said elastomer has the following specific characteristics: Shore D hardness in the range from about 40 to 65 (ASTM-D224); a compression modulus us (at 0.5 shape factor and 10% compression) in the range from about 3000 psi to about 20,000 psi, said modulus being maintained ±30% over the temperature range from 20° C. to 70° C. (ASTM-D695); a compression set of less than 60% (ASTMD395B); a hysterisis (tan $\delta$) measured at 70° C. with a Rheometrics machine (ASTM-D2236), in the range from about 0.05 to 0.15; and a flex fatigue of more than 10,000 cycles at a maximum strain of 20% under normal operating conditions ('Texus' flex test, ASTM-D3629-78)).

11. The tire of claim 8 wherein said tread, said annular body, and said wheel rim form an integral wheel structure.

12. The tire of claim 10 wherein said elastomer is polyurethane.

13. The tire of claim 12 wherein said polyurethane is derived from a reaction mixture of (a) toluenediisocyanate-poly(tetramethyleneether glycol (M.W. 1500 to about 2000) (TDI-PTMEG) prepolymer having a NCO number in the range from about 5 to about 7, and, (b) a curative in an amount sufficient to provide the desired cure of said prepolymer.

14. The tire of claim 13 wherein said curative is selected from the group consisting of methylenedianiline-NaCl complex (MDA-NaCl) curative (50% by weight in dioctylphthalate), and, methylene-bis-ortho-chloroaniline (MBOCA), the (a/b) weight ratio being in the range from 1/0.05 to about 1/0.3.

* * * * *

UNITED STATES PATENT AND TRADEMARK OFFICE
CERTIFICATE OF CORRECTION

PATENT NO. : 4,921,029

DATED : May 1, 1990

INVENTOR(S) : Richard L. Palinkas, et al

It is certified that error appears in the above-identified patent and that said Letters Patent is hereby corrected as shown below:

Column 14, Claim 1, Line 61 insert -- [ -- after "="

Column 16, Claim 10, Line 23 "(ASTMD395B)" should read -- (ASTM-D395B) --

Signed and Sealed this

Second Day of July, 1991

Attest:

HARRY F. MANBECK, JR.

*Attesting Officer*  *Commissioner of Patents and Trademarks*